Patented June 24, 1930

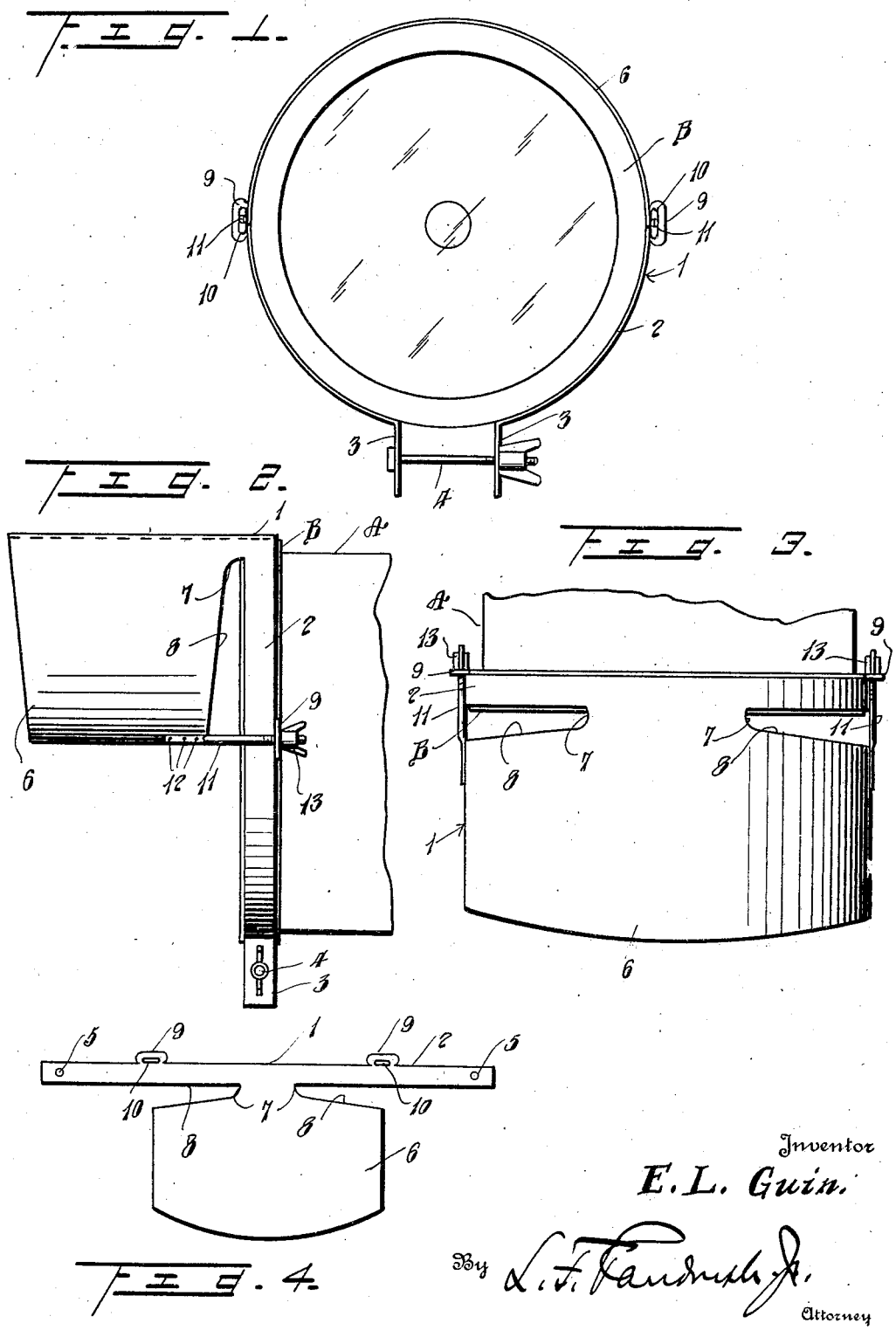

1,768,250

UNITED STATES PATENT OFFICE

EDGAR L. GUIN, OF DEERWOOD, MINNESOTA

HEADLIGHT GLARE SHIELD

Application filed July 26, 1928. Serial No. 295,405.

The invention relates to glare shields or visors or hoods adapted to be mounted on automobile headlights to prevent the blinding glare of the headlights striking in the eyes of the driver of an approaching vehicle, and to thereby make safe driving of motor vehicles at night with the bright lights on the headlights.

A further object of the invention is the provision of an improved glare shield for motor vehicle headlights that is reasonable in cost of manufacture and that is quickly installed and removed from the headlight casing and that is capable of being adjusted to properly regulate the stream of light from the headlight to prevent it shining in the eyes of drivers of approaching vehicles.

A further object of the invention is the provision of a glare shield for motor vehicle headlights comprising a split ring and a connected visor made of sheet metal, the ring being adapted to be secured in position on the lens frame of an automobile headlight and the connection between the visor and the ring being a reduced tongue forming a resilient hinge for the visor, the visor being provided with rearwardly extending arms that engage in perforated ears on the sides thereof to receive said arms, with means engaging the arms and the ears to hold the shield or visor in adjusted position.

The invention will be described in detail hereinafter and will be found illustrated in the accompanying drawings, in which Figure 1 is a front view in elevation of a motor vehicle headlight showing the improved glare shield in position thereon, Figure 2 is a side view showing the headlight casing broken away, Figure 3 is a top plan view, and Figure 4 is a view on a reduced scale of the blank from which the ring and connected visor are formed.

In the drawings similar reference characters are used to designate corresponding parts throughout the several views.

In the drawings the headlight casing is indicated at A having a lens frame B on which the improved glare shield is shown applied. The glare shield generally designated 1 is designed to be made from a single blank of sheet metal and formed with a narrow band 2 that is adapted to be engaged around the lens frame B in the form of an open ring and has its extremities bent outwardly as shown at 3 to which is secured a clamping bolt 4, the extremities of the ring or band 2 being provided with openings 5 to receive said clamping bolt 4. 6 indicates a glare shield that is formed integral with the ring or band 2 and connected thereto by means of a narrow tongue 7 that forms a resilient hinge for the shield or visor and permits adjustment of the shield or visor 6 relatively to the ring, the edges of the ring 2 and the visor 6 on each side of the tongue 7 being spaced from one another as shown at 8.

Formed integral with the band or ring 2 are ears 9 that are provided with elongated openings 10, and secured to the shield 6 are rods 11 that may be riveted thereto as shown at 12, or may be otherwise secured thereto, said rods or arms 11 having threaded extremities adapted to engage through the elongated openings 10, and 13 indicates nuts to engage the threaded extremities of the rods 11 to provide for adjustment of the shield or visor 6 to hold it in adjusted position.

What is claimed is:—

1. A headlight glare shield, comprising an open ring adapted to enclose a headlight lens frame, means to secure said ring in engagement with the frame, a visor, a tongue connecting the visor and the ring and resiliently hinging the visor thereto, the visor being terminally free of the ring, arms extending from said visor adjacent its terminals, ears on said ring having openings to receive the arms, and means engaging said arms and ears to hold the visor in adjusted positions.

2. A headlight glare shield comprising a ring adapted for attachment to a headlight lens frame, a visor extending forwardly from and integral with said ring, said visor being curved on substantially the same arc as the ring and having its terminal portion severed from and in spaced relation to the ring, ears extending outwardly from the ring, and arms extending rearwardly from the visor adjacent its terminals and passing through said ears, and adjusting means on said arms and engageable with said ears.

In testimony whereof I affix my signature.

EDGAR L. GUIN.